United States Patent [19]
Freeman et al.

[11] Patent Number: 4,769,733
[45] Date of Patent: Sep. 6, 1988

[54] WIPERS FOR PAIR OF STABILIZED MAGNETIC DISKS

[75] Inventors: Robert Freeman, Layton; Richard Howe; Brent Jenkins, both of Roy; David Jones, Layton; Merle Thowe, Harrisville, all of Utah

[73] Assignee: Iomega Corporation, Roy, Utah

[21] Appl. No.: 19,872

[22] Filed: Feb. 27, 1987

Related U.S. Application Data

[63] Continuation-in-part of Ser. No. 854,292, Apr. 21, 1986, which is a continuation-in-part of Ser. No. 440,336, Nov. 9, 1982.

[51] Int. Cl.⁴ .............................................. G11B 23/03
[52] U.S. Cl. ..................................... 360/133; 360/137
[58] Field of Search ...................... 360/98, 99, 130.34, 360/133, 137

[56] References Cited

U.S. PATENT DOCUMENTS 4,214,286 7/1980 Ragle .............................. 360/130.34

FOREIGN PATENT DOCUMENTS 594527 2/1978 U.S.S.R. .

Primary Examiner—A. J. Heinz
Attorney, Agent, or Firm—Woodcock Washburn Kurtz Mackiewicz & Norris

[57] ABSTRACT

A device and process for stabilizing two coaxially joined flexible magnetic disks is disclosed. Two or more flexible magnetic disks are coaxially joined by a coaxially located spacer. One of the disks is juxtaposed to and rotated against a flat stable Bernoulli surface. A second disk spaced by the spacer from the first disk contains centrally located perforations into which air can flow. According to certain embodiments, a flexible interdisk wiper is positioned between the disks and aids in stabilization thereof. In other embodiments, top and bottom disk wipers are also included.

14 Claims, 8 Drawing Sheets

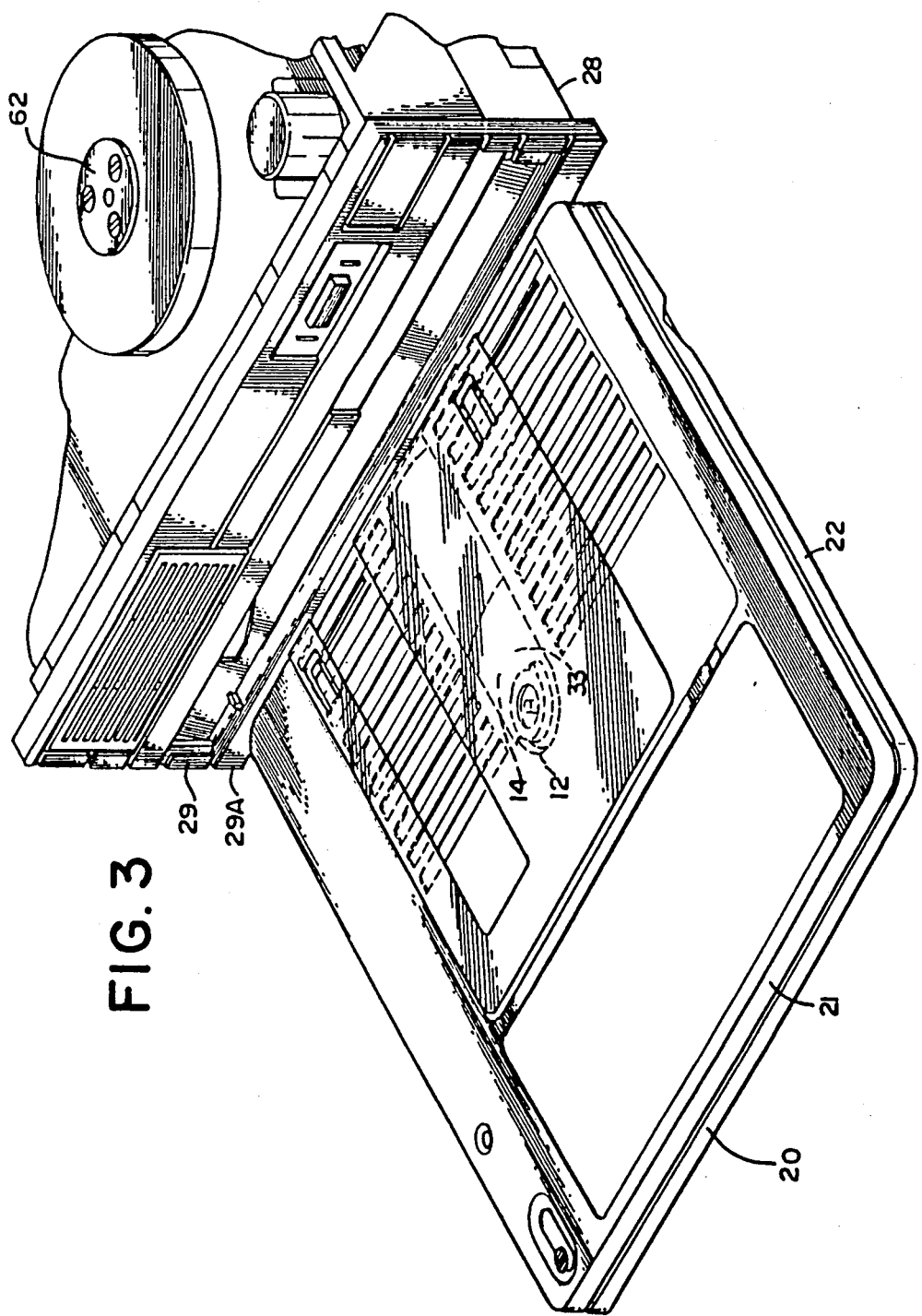

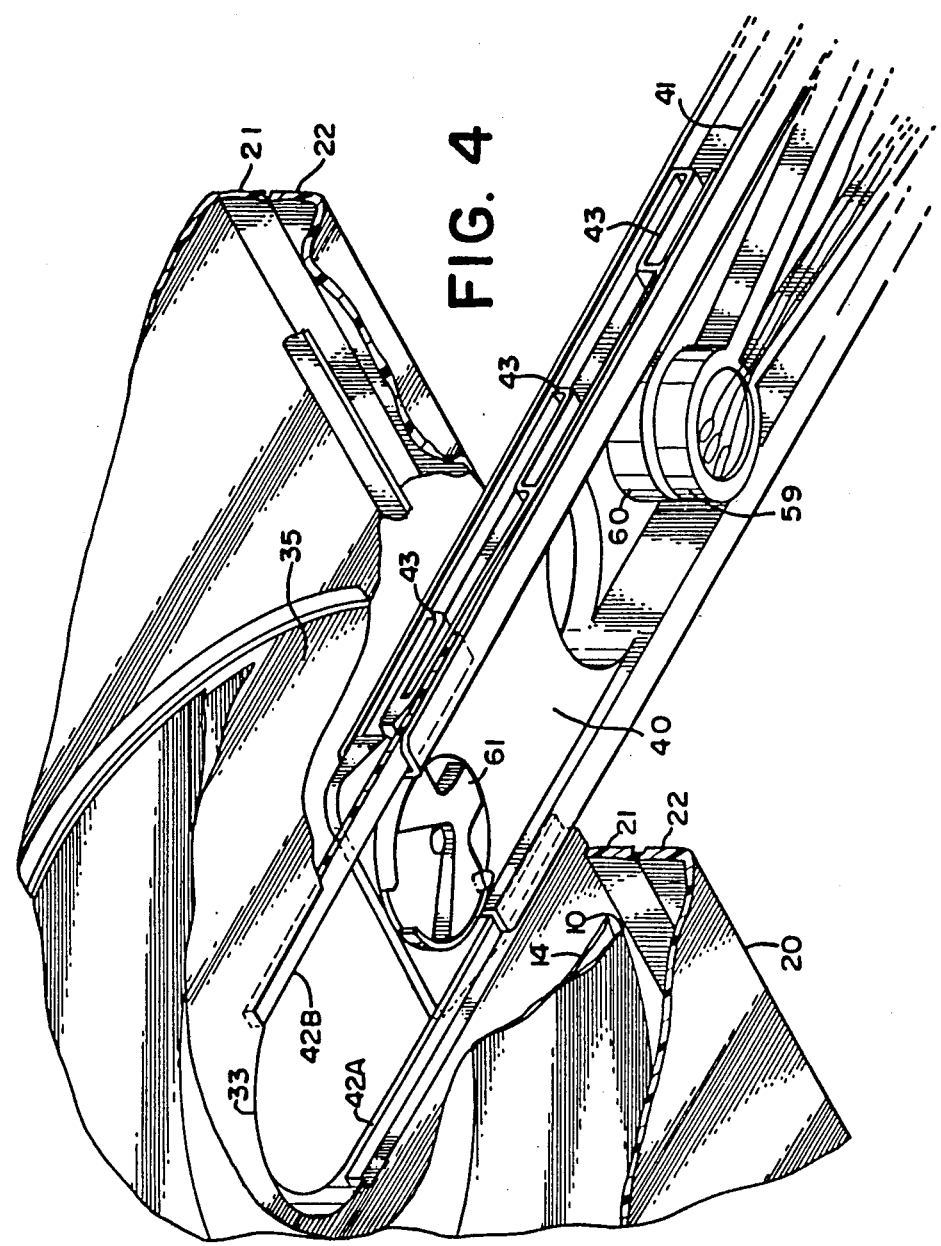

WIPERS FOR PAIR OF STABILIZED MAGNETIC DISKS

RELATED APPLICATIONS

This application is a continuation-in-part of application Ser. No. 854,292, filed Apr. 21, 1986, "PLURAL MAGNETIC DISK ASSEMBLY", Jones; and a continuation-in-part of Ser. No. 440,336 filed Nov. 9, 1982, "MAGNETIC DISK CARTRIDGE", Bauck, et al.

BACKGROUND OF THE INVENTION

The present invention relates to magnetic storage devices which use floppy record disks mounted in a cartridge. More particularly, this invention relates to the use of two or more magnetic floppy disks stabilized by a Bernoulli surface.

It is well known that a predictable and constant spacing between a record medium and a transducer is necessary in order to have successful magnetic retrieval and recording of data (i.e., read/write operation). One method of stabilizing the floppy disk is to rotate the disk at high speeds over a flat rigid plate, sometimes called a Bernoulli surface. In this way, an air bearing is created between the flexible magnetic disk and the rigid Bernoulli surface such that a constant and predictable spacing between the Bernoulli surface and the magnetic disk is established. Once the flexible magnetic disk is stabilized, the transducer can be brought into close proximity to the rotating disk at the proper distance from the disk surface. When a transducer "flies over" or is "coupled to" a magnetic disk, as those terms are used in the art, the transducer will penetrate or dimple the flexible medium. The distance between the record surface and the transducer surface can be precisely predicted when this dimpling phenomenon occurs. In this way, the floppy disk is stabilized by the Bernoulli surface and the spacing between the transducer and the disk surface can be precisely predicted and fixed.

It is desirable in the field of magnetic recording to achieve simultaneous access to two magnetic recording surfaces by two magnetic transducers. However, due to the dimpling of the magnetic medium as the transducer is flown in juxtaposition to the disk, it has not been possible to access both surfaces of the magnetic medium simultaneously when two transducers are substantially opposed to one another.

It has been shown in the prior art that two magnetic record surfaces can be accessed by two transducers by rotating each disk against a separate Bernoulli surface. See for example IBM Technical Disclosure Bulletin, Volume 19, No. 9 of February 1977. Another example of prior art which shows two magnetic disks accessed by two separate transducers is Russian Pat. No. 594527. However, in this disclosure three stabilizing surfaces are used: one below the bottom disk, one above the top disk, and a single stabilizing surface which is held between the disks in the region of the transducer.

A disadvantage of prior art attempts at accessing two magnetic surfaces simultaneously is that prior art applications are not practical in today's small and portable magnetic disk drive devices. As can be seen from the above cited references, the prior art frequently utilized separate actuators and Bernoulli surfaces for each magnetic surface. In other cases, large and complex means were used to stabilize two or more magnetic surfaces.

SUMMARY OF THE INVENTION

In accordance with this invention, two or more flexible magnetic disks are coaxially joined and axially spaced such that a continuous air bearing exists between the functional portions of the disks. An inter-disk wiper is interposed between the disks and contacts the inner surfaces of both disks. Top and bottom wipers contact the outside surfaces of the disks. The bottom wiper is staked to the inside of the cartridge along one edge. The bottom wiper extends over a rib on the inside of the cartridge so that the wiper is biased toward the disk. The flexibility of the wiper material loads the wiper against the disk. This obviates what might otherwise be a problem of proper spacing from the inside of the cartridge to the disk. The top wiper is secured by adhesive to the inside of the cover so that it contacts the outer surface of the other disk.

The wipers are made of a plastic backed-liner material. The wipers cover only a portion of the disk surface and are positioned at the back of the cartridge with respect to the recording head. This produces minimum interference with the stability of the rotating disks in the area of the transducers.

By stabilizing the disks with wipers in accordance with the invention, two substantially opposed transducers can simultaneously access the outer surfaces of two disks without causing substantial deformation of either disk by the transducer positioned adjacent to the opposite disk.

It is therefore an object of this invention to provide a compact and efficient device for recording and retrieving data to and from two flexible magnetic recording surfaces simultaneously.

It is a further object of this invention to provide a device for recording and retrieving data to and from two flexible magnetic disks contained in a rigid portable cartridge.

It is a still further object of this invention to provide a device which uses two substantially opposed transducers mounted on a common actuator for recording and retrieving data to and from two flexible magnetic disks simultaneously.

It is an additional object of this invention to provide a method for rotating two closely spaced flexible magnetic disks so as to create an outward flow of air from between the disks and stabilizing both magnetic disks by juxtaposing one of the disks to a Bernoulli surface.

The above and other features and objects of this invention will become more apparent upon consideration of the following preferred embodiment and appended claims.

BRIEF DESCRIPTION OF THE DRAWINGS

FIG. 3 is a perspective view from above of the assembled cartridge and a fragmentary perspective view of a disk drive in which it is used, where the relative positions of each is shown just prior to insertion of the cartridge into the drive.

FIG. 4 is a cut away perspective view of a disk drive from below, which shows the assembled cartridge partially inserted into the disk drive.

FIG. 8c is a plan view of the dome shaped spring shown in FIG. 8a.

DETAILED DESCRIPTION

FIGS. 1–5 show an embodiment of a disk drive claimed in the aforesaid Jones application. Included with a description of this first embodiment is a description of the features common to the preferred embodiment claimed herein. Following thereafter is a description of the preferred embodiment of this invention insofar as it differs from the first embodiment.

DESCRIPTION OF THE FIRST EMBODIMENT

In the first embodiment two coaxially joined magnetic disks are spun against a Bernoulli surface contained within a rigid cartridge. An opening in this cartridge allows access by two substantially opposed transducers into the cartridge such that the outer surface of each magnetic disk can be simultaneously accessed by a separate transducer.

Figure 1A:
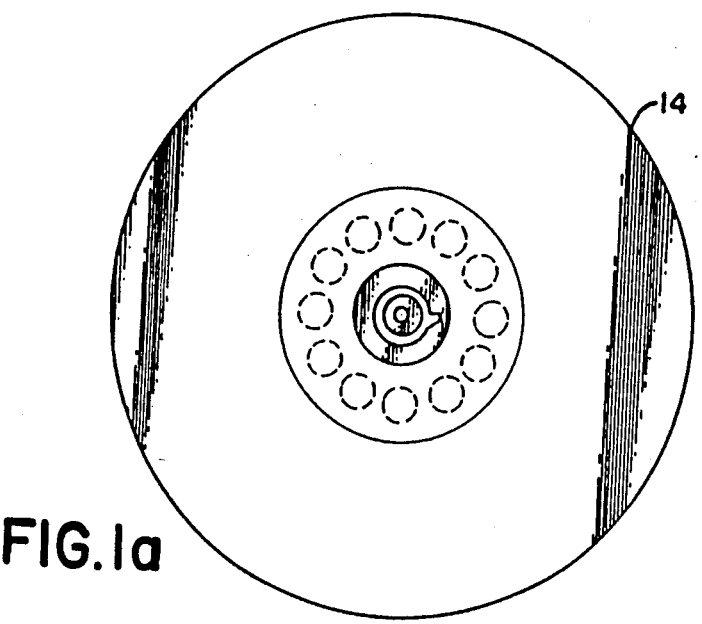
FIG. 1a is a top plan view of the upper disk.
Figure 1B:
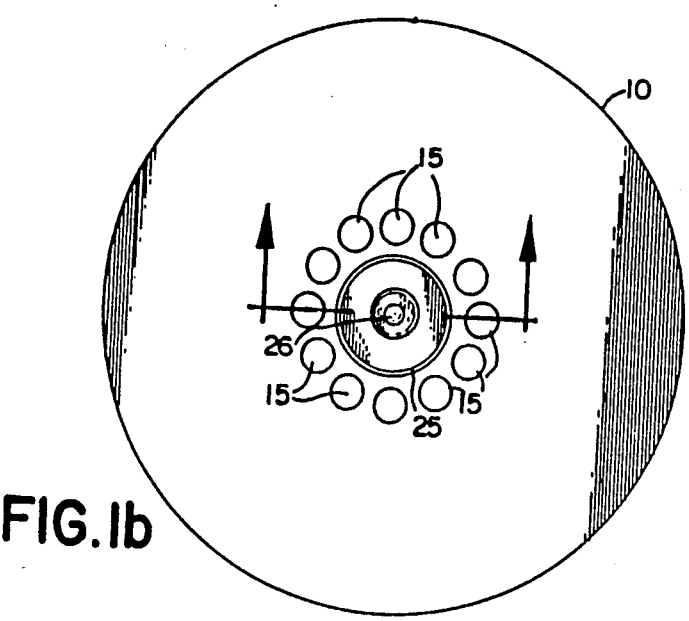
FIG. 1b is a bottom plan view of the lower disk.
Figure 1C:
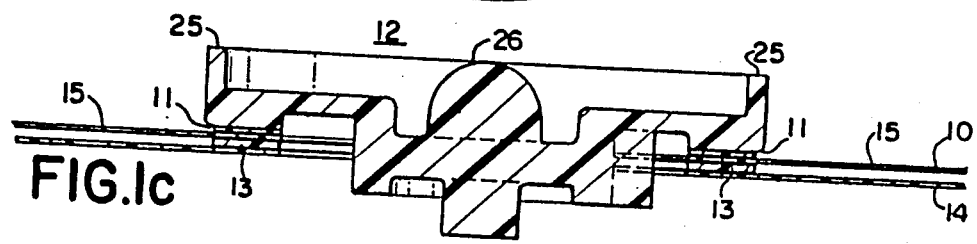
FIG. 1c is a cross-sectional view of the disk pair taken substantially along line 1c-1c of FIG. 1b, showing the upper disk and lower disk attached to a centrally mounted disk hub.

Referring to FIGS. 1a–1c, the upper magnetic disk 14 of the first embodiment of this invention is joined to surface 11 of disk hub 12. Spacer 13 is coaxially joined (as described below) to disk 10 and disk 14. Disk 10 contains an array of twelve perforations 15 equally spaced from one another and equidistant from the center of disk 10. When disk 10 and disk 14 are rotated together on disk hub 12 at high speeds, apertures 15 allow air to move radially out from between disk 10 and disk 14. The flow of air is shown by the arrows marked AIR in FIG. 5a. In the preferred embodiment of this invention, disks 10 and 14 have nominal dimensions equivalent to the standard 5.25 inch "MYLAR" floppy disks widely used in the industry.

In order to achieve the proper flow of air from between disk 10 and disk 14, the thickness of disk spacer 13 is of critical importance. While the exact thickness will be a function of parameters such as the type of transducers used, the rate of rotation of the disks, the thickness of the disks, diameter of the disks, and others, the disk spacer should be approximately 0.25 mm thick for a standard disk thickness of approximately 0.1 mm. In addition, the disk spacer is not so large in diameter so as to impede the flow of air into apertures 15 or to engage the magnetically functional portion of either disk; for example, the outer diameter of disk spacer 13 is approximately the same as the outer diameter of disk hub 12. Disk spacer 13 is preferably integrally joined to disks 10 and 14 in order to achieve the most precise spacing between the disks, as more fully disclosed in copending application Ser. No. 854,130, filed Apr. 21, 1986.

Figure 2:
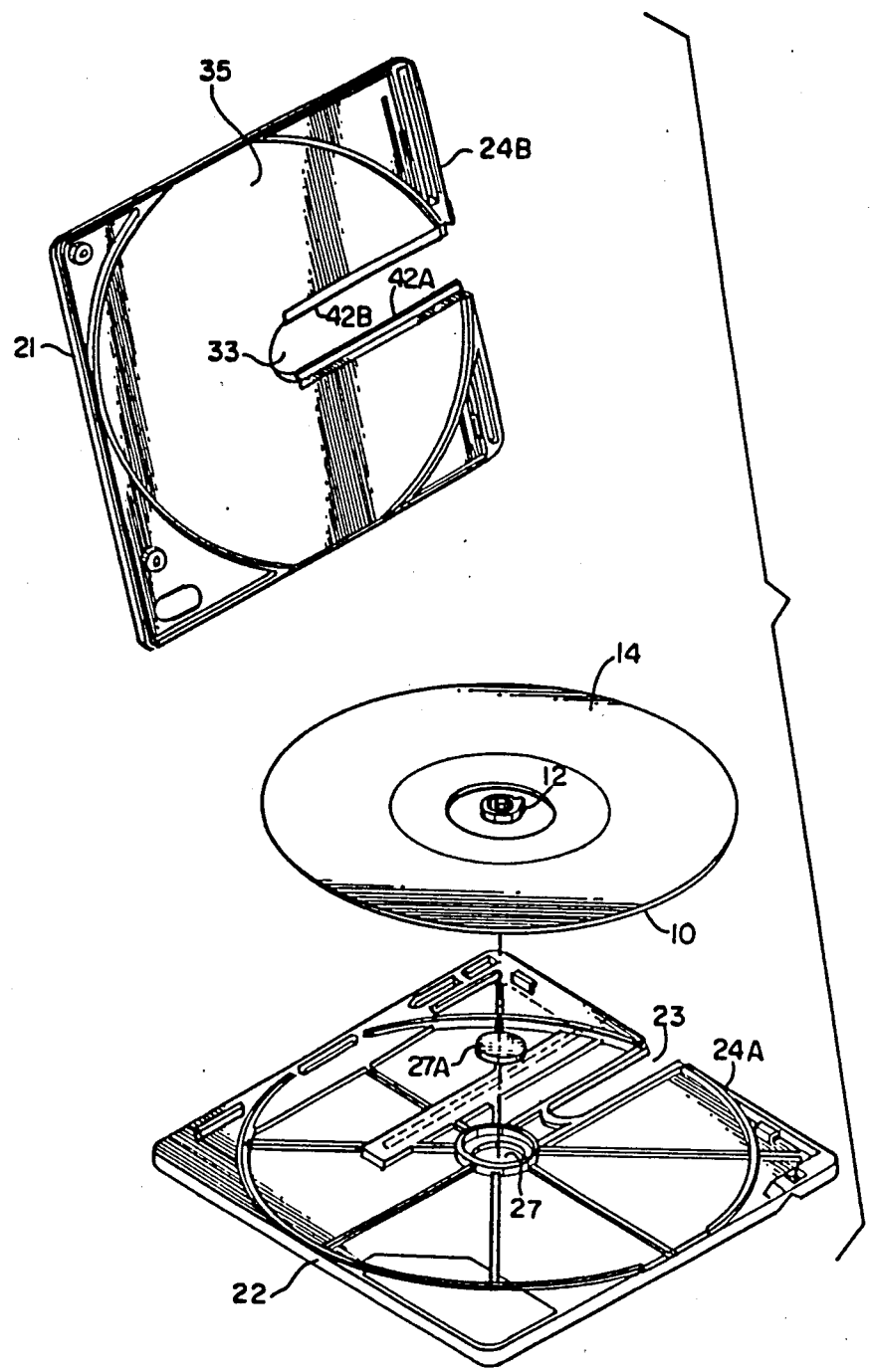
FIG. 2 is an exploded perspective view of the disk cartridge which shows the interior surfaces of the cartridge and the disks contained within the cartridge.

According to the first embodiment of this invention, disks 10 and 14 are contained in a rigid cartridge 20. FIG. 2 is an exploded perspective view of cartridge 20 showing: the inside surface of cartridge top 21, the inside surface of cartridge bottom 22, and disk pair 10 and 14. In assembled form, disks 10 and 14 are contained within the chamber formed by joining cartridge bottom 22 and cartridge top 21. The cartridge bottom 22 has an opening 23 extending from its leading edge 24A to a point short of the center of the cartridge. The cartridge top 21 contains a Bernoulli surface 35 on its inside face which substantially inscribes a circular area therein. Cartridge top 21 has an opening 33 which, in assembled form, is coincidental with the opening 23 in the cartridge bottom 22 and extends from the leading edge 24B of cartridge top 21 to a point beyond the center of the cartridge.

Referring to FIGS. 1c and 2, the lower surface of disk hub 12 has a circumferential rim 25. A concentric knob 26 extends from the lower surface of disk hub 12 and to the plane formed by the circumferential rim 25. The lower surface of disk hub 12 sits in a dish-like opening 27 in cartridge bottom 22. The center of opening 27 is substantially in line with the center line of opening 33 in cartridge top 21 when the cartridge is assembled. Concentric knob 26 serves to provide a low friction surface on which the magnetic disks are rotated. Between the surface of dishlike opening 27 and concentric knob 26 is a resilient member 27A, as best revealed in FIG. 2. This member exerts a constant upward force on knob 26, thus assuring that the outer surface of disk 14 is urged towards Bernoulli surface 35. The resilient member can be an elastomeric disk as shown, a domed shape spring as disclosed in co-pending Ser. No. 854,333, filed Apr. 21, 1986 or any other device which serves this purpose. When motor spindle 61 (FIG. 4) enters cartridge 20 through aperture 33 in cartridge top 21 and rotates disk hub 12 at speeds known to those skilled in the art, an air bearing is formed between the surface of disk 14 and Bernoulli surface 35 as shown by the arrows marked AIR in FIG. 5a. This air bearing serves to stabilize disk 14 as it rotates in juxtaposition to the Bernoulli surface 35. During high speed rotation of the disk pair, centrifugal force causes air to be ejected from between the disks. Evacuation of air from between disk 10 and 14 results in a partial vacuum between the disks wherein the atmosphere surrounding the disks is at a higher pressure than the pressure between the disks. This pressure differential causes flow of air into openings 15 and then radially out from between the disks which in turn sets up a stabilizing air bearing or cushion of air between disks 10 and 14. In this way, disk 14 is stabilized by the rigid Bernoulli surface 35 in cartridge top 21, and disk 10 is in turn stabilized by rotation in juxtaposition to the stabilized surface of disk 14. In this manner both disks are stabilized by the single Bernoulli surface. While this invention is described with respect to an embodiment providing a disk pair, it will be appreciated by those skilled in the art that this invention is not so limited. That is, it may be possible according to this invention to stabilize three or four rotating floppy disks with a single Bernoulli surface.

The air ejected radially from between disk 10 and 14 when the disk pair is rotated at sufficient speed sets up an air bearing between the two disks as disclosed. The rate of rotation necessary to effect this air bearing is a function of several parameters, such as: disk size, aperture configuration, disk thickness, disk diameter, disk spacing, and others. It has been found that speeds as low as 1500 rpm are adequate to produce an effective air bearing between the disks. However, stabilization can be achieved when the disks are rotated at higher speeds; for example, at 3000 rpm. Variation of the pertinent parameters to achieve a balance between rotation speed and disk wear is within the scope of this invention. In addition, variation of the shape, size, and number of apertures 15 is also within the scope of this invention, although it has been found that simple round holes as shown are preferred.

Two disks stabilized according to this invention can be accessed for read/write operation by two substantially opposed magnetic transducers simultaneously. Referring to FIGS. 3 and 4, a drive spindle 61 (FIG. 4) has access to the interior of the cartridge 20 through opening 33 in the cartridge top 21 and transducers 59 and 60 have access to the interior of the cartridge through openings 23 and 33. Drive spindle 61 and transducers 59 and 60 are mounted within disk drive 28. Drive spindle 61 is coaxially mounted to drive motor 62 for rotation thereby, as disclosed in co-pending applications Ser. Nos. 854,333 and 854,342 filed Apr. 21, 1986. In the preferred embodiment, disk hub 12 is coupled to drive spindle 61 according to the method and apparatus disclosed in co-pending application Ser. No. 854,333 filed Apr. 21, 1986.

Figure 5A:
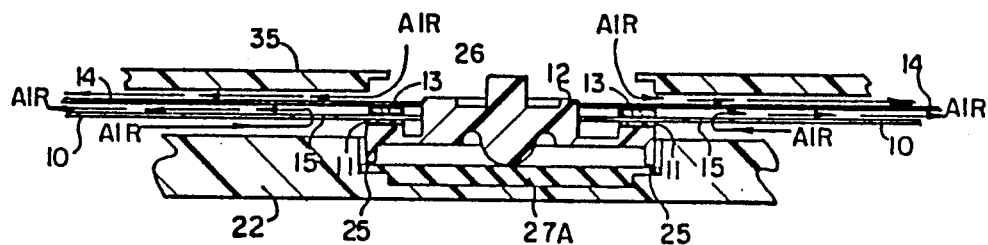
FIG. 5a is a cross-sectional view of the central portion of the assembled cartridge as the disk pair is spinning at high speed.
Figure 5B:
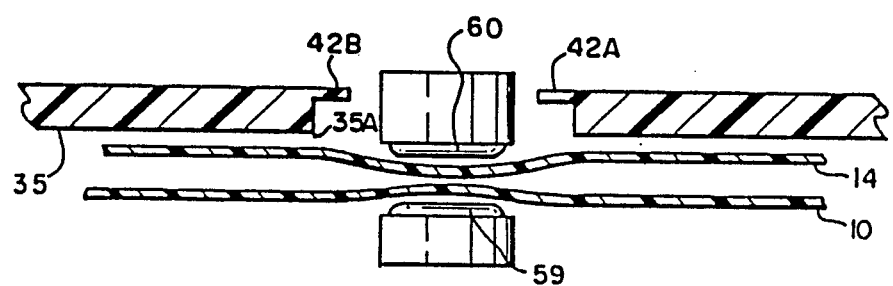
FIG. 5b is a diagrammatic view of the disk pair in read/write relationship to a pair of opposed transducers as the disk pair is spinning at high speed.

FIG. 3 shows cartridge 20 assembled and about to enter disk drive 28 through opening 29. Opening 29 is normally closed by hinged cover 29A which is moved to an open position as cartridge 20 is inserted into drive 28. Once cartridge 20 is fully inserted into drive 28, transducers 59 and 60 are actuated towards disks 10 and 14 and sandwich the disks between their surfaces during the read/write function. A proper transducer surface in close proximity to the disk surface causes each disk surface to "dimple". This phenomenon, shown in FIG. 5b, is known as "coupling" the disk to the transducer and is an essential feature of high performance magnetic recording and retrieval. It is therefore apparent that two sides of a single flexible magnetic disk could not be simultaneously accessed by two substantially opposed heads; for example, if a single disk were used, head 59 would interfere with the coupling of head 60, and head 60 would likewise interfere with the coupling of head 59. When two magnetic disks are used according to this invention, however, the air bearing created between the disks as they are rotated serves to stabilize the disks as well as to cushion each disk with respect to the other so that coupling can take place. In this way, two magnetic surfaces can be simultaneously coupled to two transducers in practically the same space required for a single disk. Both embodiments of this invention therefore advantageously utilize a small portable cartridge to house the invention.

Referring once again to FIG. 4, cartridge 20 is seen in a cut away perspective view from below as it engages spicule member 40 within disk drive 28. Disk hub 12A has been cut away from this view in order to more clearly show how the disks are aligned and rotated. Drive spindle 61 is rotatably mounted to spicule member 40. Spicule member 40 contains reference surfaces 41 which are a precise predetermined distance from the surface of drive spindle 61. When cartridge 20 is inserted into disk drive 28, rails 42A and 42B in cartridge 20 engage reference surface 41. "S" shaped resilient members 43 insure continued and firm contact between reference rails 42A and 42B and reference surface 41 while the cartridge is within disk drive 28. As fully disclosed in co-pending applications Ser. Nos. 854,333 and 854,130 filed Apr. 21, 1986, this interaction between reference rails 42A/42B and reference surface 41 assures proper planar alignment between the disk pair, the transducers, and the Bernoulli surface.

DESCRIPTION OF THE PREFERRED EMBODIMENT

In the description of the preferred embodiment that follows, features which are generally common to the first embodiment of this invention have been designated by the same symbol used to describe the first embodiment. In addition, the preferred embodiment will be described in detail only so far as it differs from the first embodiment described earlier.

Figure 6:
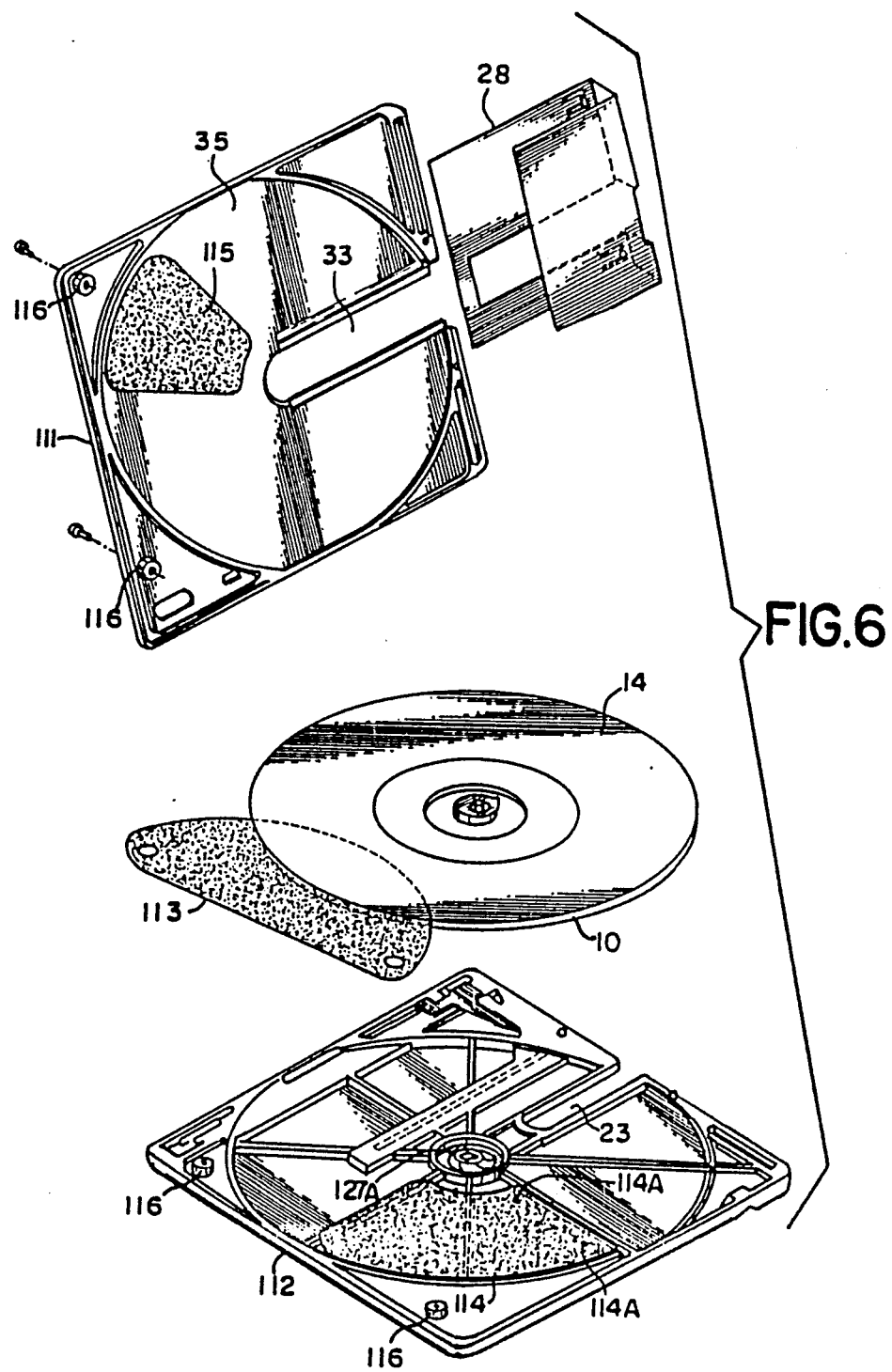
FIG. 6 is an exploded perspective view of the disk cartridge made according to the preferred embodiment of this invention which shows the interior surfaces of the cartridge and the disks contained within the cartridge.

Referring now to FIG. 6, an exploded perspective view of cartridge 101 shows the inside surface of cartridge top 111; the inside surface of cartridge bottom 112; inter disk wiper 113 sandwiched by disk pair 10 and 14; and shutter 28. In assembled form, disks 10 and 14 are contained within the chamber formed by the joining of cartridge bottom 112 and cartridge top 111, and shutter 28 is slideably mounted on the cartridge. Bottom disk wiper 114 is heat staked to the cartridge bottom 112 at heat stake points 114A. When in assembled form, the lower surface of disk 10 contacts bottom disk wiper 114. When the cartridge is inserted into the disk drive 28 and rotated thereby, any foreign materials on the underside of disk 10 are wiped away as the disk contacts bottom disk wiper 114. Inter-disk wiper 113 is sandwiched between disk 14 and disk 10 and serves to remove contaminates from between the disk pair as the disk rotates. Hold down nodes 116 in cartridge top 111 engage hold down nodes 117 in cartridge bottom 112 and hold inter-disk wiper 113 within the cartridge and between the disks. Top wiper 115 is adhesively joined to Bernoulli surface 35 and wipes the upper surface of disk 14 as it rotates.

Since each of the wipers described above is in contact with a portion of the disk pair as it rotates, the placement and characteristics of the wiper relative to disk pair 10/14 are important features of this invention. In the view shown in FIG. 6, disk pair 10/14 is rotated in the clockwise direction when used in disk drive 28. As mentioned earlier, rotation of the disk pair at proper speeds causes an air bearing to be formed between Bernoulli surface 35 and upper disk 14 as well as between disk 14 and 10. These air bearings serve to stabilize the floppy disks as they rotate and thus allow precise and accurate magnetic transduction of the data contained thereon. Since transduction of the data in both the first and second embodiments of this invention takes place in the region of apertures 23 and 33 in the disk cartridge, it is important that the wipers included in the cartridge according to this second embodiment produce minimum interference with the stability of the rotating disks in the region of apertures 23 and 33. Applicant has found that placement of the wipers 113, 114, and 115 in the rear of the cartridge produces minimum interference with the stability of the rotating disks in the area where transduction occurs. As the term is used herein, the rear of the cartridge comprises that region of the cartridge which is angularly displaced from the center line of the apertures 23 and 33 by greater than about 90° and less than about 270° from the point of view of the rotating disks. It is also preferred that the top and bottom wipers are made from a suitable wiper laminant and that all three wipers are constructed so as be substantially burr and tear free. In addition, the wipers are substantially flat and wrinkle free. Although the exact shape and thickness of each wiper will depend upon the specific other dimensions of the cartridge, the wipers in no event are of a shape or thickness which interferes with the stability of the rotating disks. Applicant has found that use of inter-disk wiper 113 according to the most preferred embodiment of this invention has a tendency to augment the stabilization of the disk pair during high speed rotation. While the exact principle behind this surprising phenomenon is not understood, the result is clearly desirous.

The shape, location, and materials for the wipers in the most preferred embodiment of this invention will now be described. Bottom disk wiper 114 is a quarter moon shaped wiper located in the second quadrant of the cartridge, as measured relative to the disk pair as it rotates past opening 23. Wiper 114 is comprised of a plastic/rayon laminant wherein the plastic acts as a backing material to provide rigidity to the wiper and the rayon provides a textured wiping surface in contact with the disk. In the preferred embodiment, the bottom wiper 114 is approximately 0.40 mm thick and positioned so as to just contact the lower surface of disk 10 when the disk pair rotates. Inter-disk wiper 113 is half moon shaped and is contained in the rear half of the cartridge. The inter-disk wiper is a non woven rayon/nylon blend. In the preferred embodiment of this invention, the inter-disk wiper is of a thickness approximately twice to the spacing between the disks. In the most preferred embodiment, inter-disk wiper 114 is approximately 0.44 mm thick. Top wiper 115 is wedge shaped and contained in the second quadrant of the cartridge. This disk wiper is made of the same rayon/plastic laminant used for the bottom wiper 114. In the preferred embodiment, top wiper 115 is of a thickness approximately equal to the spacing between the upper surface of disk 114 and Bernoulli surface 35 during high speed rotation of the disks. In the most preferred embodiment, wiper 115 is also approximately 0.40 mm thick.

Figure 7A:
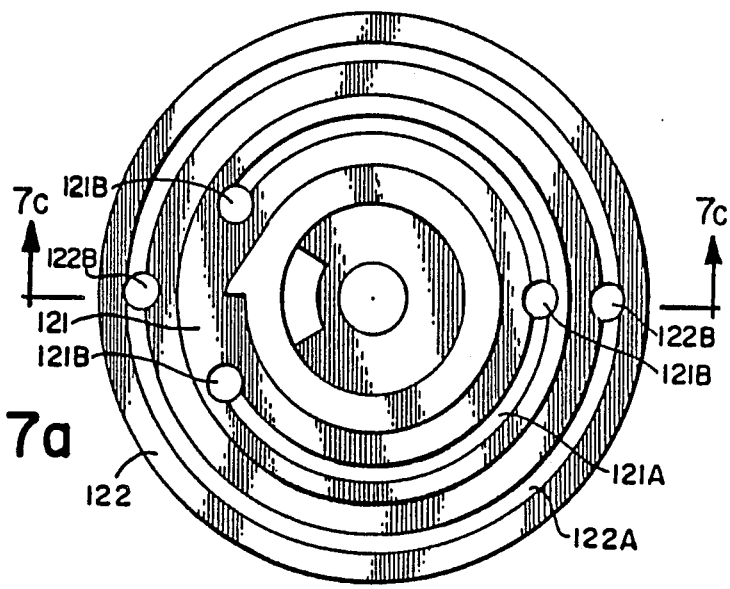
FIG. 7a is a top plan view of the disk hub made according to the preferred embodiment of this invention.
Figure 7B:
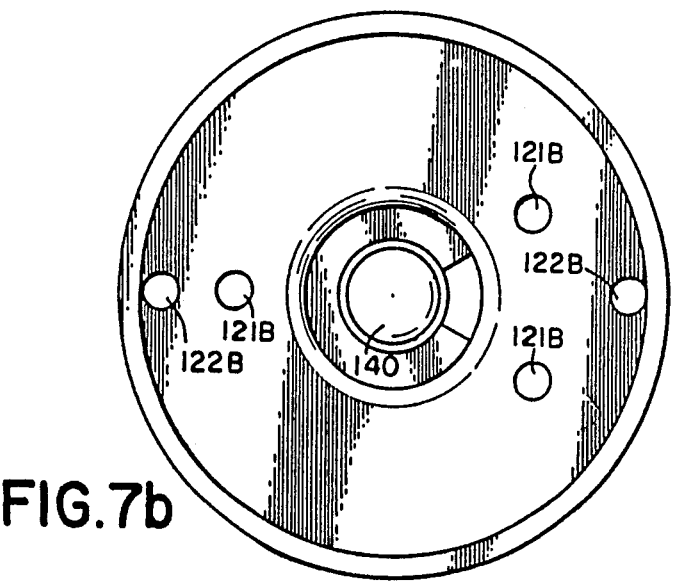
FIG. 7b is a bottom plan view of the disk hub made according to the preferred embodiment of this invention.
Figure 7C:
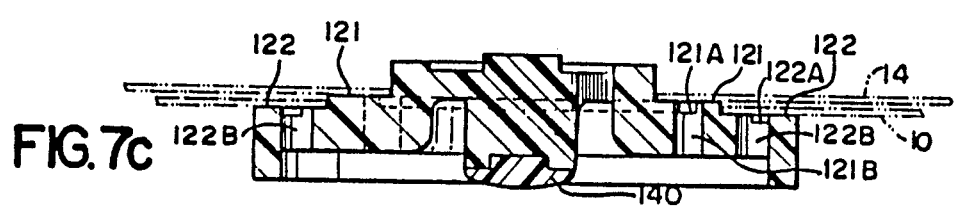
FIG. 7c is a cross-sectional view through the center of the disk hub taken substantially along the lines 7c–7c of FIG. 7b.
Figure 8A:
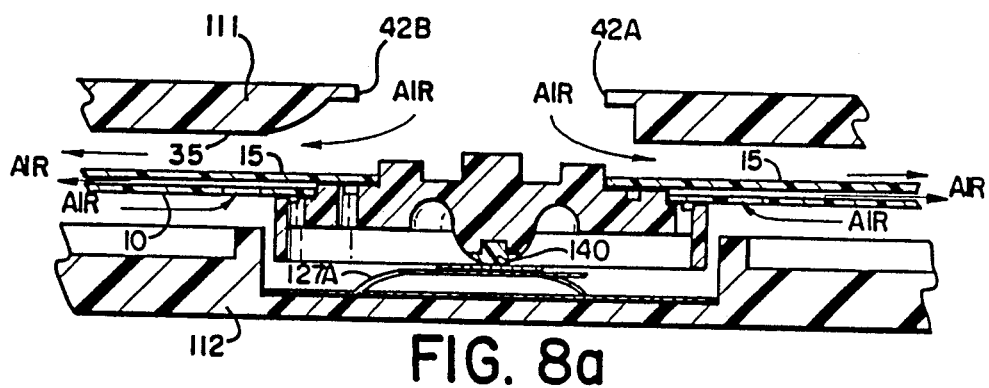
FIG. 8a is a cross-sectional view of the central portion of the assembled cartridge made according to the preferred embodiment of this invention as the disk pair is spinning at high speed.
Figure 8B:
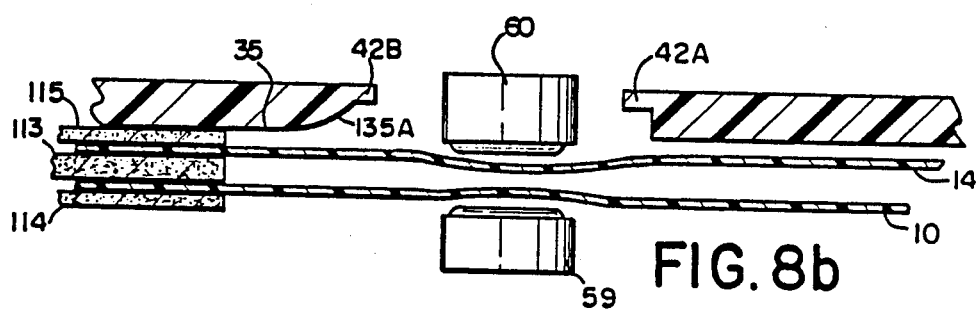
FIG. 8b is a diagrammatic view of the disk pair according to the preferred embodiment of this invention in read/write relationship to a pair of opposed transducers as the disk pair is spinning at high speed.
Figure 8C:
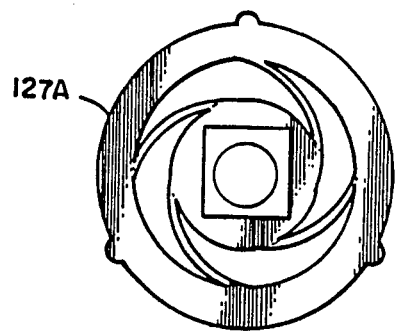

Referring now to FIGS. 7a through 7c, the relationship between disk pair 10/14 and disk hub 120 is revealed. Disk hub 120 contains two coaxial, axially spaced plateau surfaces: upper plateau 121 and lower plateau 122. Upper disk 14 is mounted to upper plateau surface 121 and lower disk hub 10 is mounted to lower plateau surface 122. The spacing between the disks is determined by th spacing between the respective plateau surfaces. In this second embodiment, each disk is mounted directly to disk hub 122, thereby eliminating the need for a disk spacer between the disks while maintaining precise spacing between the disks.

In the most preferred embodiment of this invention, it is desirable that disk hub 120 and disk pair 10/14 have substantially the same coefficients of expansion. This is an important feature of this invention since different coefficients of thermal expansion may cause a buckling or warping of one disk with respect to the other. It will be appreciated by those skilled in the art, however, that achieving this objective is a relatively difficult task since the polyester film used for the floppy disk is inherently flexible; on the other hand it is necessary that the disk hub of this invention be relatively rigid and hard. Accordingly, it has been discovered that a disk hub comprised of 20 to 30% glass filled polycarbonate has substantially the same coefficient of thermal expansion as the polyester film used for the floppy disk pair. Referring now to FIG. 9A, a cross-sectional view of the central portion of the assembled cartridge during high speed rotation made according to the second embodiment of this invention is revealed. This view reveals the following distinctions between the first embodiment and the second embodiment: domed shaped spring member 127A is used in place of elastomeric disk 27A of the first embodiment; disk hub 120 described earlier is used in place of disk hub 12 of the first embodiment; the transition from cartridge rail 42B to Bernoulli surface 35 has been rounded from the sharp angled portion 35a shown in FIG. 5b to a more aerodynamic shape as indicated at 135A in FIG. 9b. Referring now to FIG. 9b, which is a diagrammatic view of the disk pair in read/write relationship to transducers 59 and 60, disk pair 10/14 is rotated generally from right to left. During the read/write operation, disk 10 and disk 14 each dimple as they move past transducers 59 and 60. This dimpling effect causes a deflection or curvature of the disk in the area of the transducer. This deflection or non linear movement of disk 14 tends to accelerate the disk towards Bernoulli surface 35 as the disk comes off transducer 60. In order to protect the disk from "kicking" or "banging" into the Bernoulli surface or into the transition between the Bernoulli surface and rail 42A, applicant has found that forming transition 135A in an aerodynamic shape allows stable movement of disk 14 from the coupled to the uncoupled position. This feature not only achieves a more stable coupling between the transducer and the disk, but also avoids damage to the disk which may be caused by a violent crashing of the disk into the sharp angle transition of the first embodiment.

While particular embodiments of this invention have been shown and described, modifications are within the true spirit and scope of this invention. The appended claims are, therefore, intended to cover all such modifications.

What is claimed is:

1. A magnetic data storage cartridge of the type in which storage disks are rotated by a drive spindle in read/write relationship with two substantially opposed transducers comprising:
   two flexible storage disks;
   a spacer for coaxially joining said disks in precise spaced relation, said spacer being substantially coaxial of said disk and being of a smaller diameter than said disks; and
   a flexible inter-disk wiper secured to said cartridge and positioned between said disks to stabilize said disks during rotation.

2. The cartridge recited in claim 1 wherein said inter-disk wiper is half-moon shaped and is located in the rear half of said cartridge, in relation to the rotation of said disks past said transducers.

3. The cartridge recited in claim 1 wherein said inter-disk wiper is located at the rear of said cartridge.

4. The cartridge recited in claim 1 wherein said inter-disk wiper is of a thickness approximately equal to twice the spacing between said disks, and wherein said inter-disk wiper contacts the inner surfaces of said disks.

5. The cartridge recited in claim 1 wherein said two flexible disks comprise a generally planar bottom disk and a generally planar upper disk, said cartridge further comprising:
   a bottom disk wiper secured to said cartridge and in contact with the lower surface of said bottom disk and a top disk wiper secured to said cartridge and in contact with the upper surface of said top disk.

6. The cartridge recited in claim 5 wherein said bottom disk wiper has a quarter-moon shape and is located in the second quadrant of said cartridge in relation to the rotation of said disks past said transducers.

7. The cartridge recited in claim 5 wherein said top wiper is wedge-shaped and is located in the third quadrant of said cartridge relative to the rotation of said disks past said transducers.

8. The cartridge recited in claim 5 wherein said inter-disk, top and bottom, wipers are located at the rear of said cartridge.

9. The cartridge recited in claim 5 wherein said bottom wiper is a laminated flexible plastic wiper.

10. The cartridge recited in claim 9 further comprising:
    rigid side walls forming a container for said disks;
    one of said side walls having a rib on the inside surface thereof extending outwardly from the center of said cartridge;
    said bottom disk wiper being staked to said one side wall at two points near one edge of said wiper, said bottom wiper extending over said rib and into contact with said bottom disk whereby said wiper is biased against said bottom disk by the flexibility of said wiper.

11. The cartridge recited in claim 10 wherein said top wiper is attached by adhesive to the inner surface of the other side wall.

12. The cartridge recited in claim 1 wherein said flexible storage disks are magnetic storage disks.

13. The cartridge recited in claim 12 in combination with a magnetic data storage drive having two substantially opposed magnetic transducers.

14. The cartridge recited in claim 13 further comprising:
    a Bernoulli surface juxtaposed to a first of said disks so that said disk is stabilized by said Bernoulli surface when said disks are rotated by said drive spindle.

* * * * *